United States Patent [19]

Pirner et al.

[11] 4,216,016

[45] Aug. 5, 1980

[54] FILLER METAL FOR WELDING ALUMINUM ALLOYS

[75] Inventors: Miroslav Pirner, Neuhausen am Rheinfall; Heinrich Zoller, Aesch; Heinz Bichsel, Neuhausen am Rheinfall, all of Switzerland

[73] Assignee: Swiss Aluminium Ltd., Chippis, Switzerland

[21] Appl. No.: 948,959

[22] Filed: Oct. 5, 1978

Related U.S. Application Data

[63] Continuation-in-part of Ser. No. 914,531, Jun. 12, 1978, abandoned.

[30] Foreign Application Priority Data

Jun. 29, 1977 [CH] Switzerland ..................... 007983/77

[51] Int. Cl.$^2$ ............................................. C22C 21/18
[52] U.S. Cl. ..................................... 75/141; 148/32.5
[58] Field of Search ........................ 75/141, 142, 146; 148/32, 32.5

[56] References Cited

U.S. PATENT DOCUMENTS 2,245,167   6/1941   Stroup ................................... 75/141

*Primary Examiner*—R. Dean
*Attorney, Agent, or Firm*—Robert H. Bachman

[57] ABSTRACT

Filler metal for welding aluminum base alloys obtains improved resistance to stress corrosion cracking. The composition of the filler metal includes a copper addition which suppresses weld boundary corrosion. High weld strengths are attained using the said filler metal.

3 Claims, No Drawings

FILLER METAL FOR WELDING ALUMINUM ALLOYS

CROSS-REFERENCE TO RELATED APPLICATIONS

This case is a continuation-in-part of copending U.S. patent application Ser. No. 914,531 for FILLER METAL FOR WELDING ALUMINUM ALLOYS By Miroslav Pirner, Heinrich Zoller and Heinz Bichsel, field June 12, 1978, abandoned.

BACKGROUND OF THE INVENTION

The invention concerns a filler metal for welding aluminum alloys, in particular for welding alloys of the AlZnMg type.

AlZnMg alloys have found wide application because of their good weldability, in particular because the weld region hardens at room temperature to the strength level of the parent metal. Initial difficulties, which were due to poor resistance to stress corrosion, were overcome by choosing the appropriate alloy composition, for example, by having an appropriate Zn/Mg ratio and by suitable heat treatment, for example, multi-stage artificial aging.

It is also know that additions of copper in amounts up to 2.0% to the AlZnMg type alloy raises the strength and to a large extent prevents stress corrosion cracking from occurring.

In using these alloys in welded constructions, however, it has been found that the welds meet the requirements regarding stress corrosion and exfoliation corrosion susceptibility only when the construction has been heat treated as a whole. It has been found impossible to comply with this requirement, in particular in the case of large welded constructions.

Various efforts have been made to improve the corrosion resistance of the weld by means of suitable filler metals. Thus, for example, in the Aluminium Taschenbuch, 13th issue, Page 551, non age-hardenable alloys of the type AlSi, AlMg and AlMgMn have been suggested for welding AlZnMg 1. The corrosion problems are indeed solved this way, but only low weld strengths can be achieved with these materials. It is clear, therefore, that the high strength values which can be reached with AlZnMg alloys in welded constructions cannot be exploited with these materials.

Attempts have already been made to use AlZnMg alloys as filler metal. Thus, for example, in the German Patent DT-OS No. 22 34 111, an age-hardenable aluminum filler metal of the following composition has been proposed: zinc from 2.0 to 6.0%, magnesium from 1.5 to 5.0%, chromium from 0.1 to 0.7%, silver from 0.05 to 1.04%, bismuth from 0.001 to 1.0%, beryllium from 0.001 to 1.0%, zirconium from 0.05 to 0.2%, less than 0.4% manganese, less than 0.2% silicon, less than 0.5% iron, and less than 0.08% copper.

The mechanical properties in the weld which can be achieved with this filler metal are comparable with those of the parent metal. This filler metal also allowed the requirements regarding stress corrosion susceptibility to be satisfied to a large degree. It has been found, however, that in spite of optimal heat treatment of the welded construction, there is relatively large susceptibility to weld boundary corrosion. Therefore, although adequate strength values are obtained with such welds, there are risks involved in their use in corrosive surroundings.

SUMMARY OF THE INVENTION

The inventor set himself the task of developing a filler metal which produces welds of the same strength as the parent metal and at the same time having good corrosion resistance in corrosive environments.

The object of the invention is fulfilled by way of the novel aluminum base alloy of the present invention, and specifically by way of a filler metal according to DIN 1732, sheet 1 to which has been added copper in the amount of 0.2 to 0.5%. Specifically, the alloys of the present invention consist essentially of: zinc from 0.05 to 0.25%, magnesium up to 5.5% and preferably from 0.05 to 5.5%, copper from 0.2 to 0.5% and preferably from 0.25 to 0.5%, manganese from 0.05 to 2.5%, titanium from 0.1 to 0.25%, chromium from 0.05 to 0.3%, and balance aluminum. The alloy of the present invention also should contain less than 0.3% silicon and less than 0.4% iron.

The aforesaid copending application Ser. No. 914,531, abandoned claims the addition of copper to alloys of the AlMgAn type in order to develop a filler metal which produces welds of the same strength as the parent metal plus having good corrosion resistance.

DETAILED DESCRIPTION

It was found, surprisingly, in accordance with the present invention that the foregoing filler metals can be used for welding AlZnMg alloys without the previously mentioned disadvantages being encountered, when the foregoing copper addition is made to a filler metal of the types AlMg, AlMn, AlMgMn in the amounts according to the present invention. It is assumed that above all the copper addition prevents both the occurrence of stress corrosion and weld boundary corrosion, and that the amounts of manganese, titanium and chromium are responsible for reducing susceptibility to weld cracking. Metallographic investigations have shown that the copper addition influences the cast structure during solidification of the weld bead, and consequently influences the boundary between the weld bead and the parent metal, in such a way that stress corrosion and in particular weld boundary corrosion are to a large extent avoided.

Particularly surprising was that the filler metal with the amount of copper added in accordance with the present invention raised the resistance of the weld to stress corrosion considerably, without causing a corresponding increase in susceptibility to exfoliation corrosion in the heat affected zone in the parent metal.

The filler metal of the invention has also been found to be suitable for welding constructional parts of AlAnMg alloys to parts made out of other types of alloys, such as, e.g., AlMn or AlMg alloys.

The advantages of the weld filler metal of the invention will now be illustrated in some detail by means of the following examples.

EXAMPLE I

Sammples of 4 mm thick, naturally aged sheet of an AlZnMg 1 alloy were welded with the aluminum base alloy filler metals of composition given in Table I using MIG-pulsed-arc welding. The welds were then tested for comparison purposes.

TABLE I

| Filler Metal | Zn | Mg | Cu | Ag | Mn | Ti | Cr | Zr | Si | Fe |
|---|---|---|---|---|---|---|---|---|---|---|
| A | 1.9 | 4.1 | 0.03 | — | 0.45 | 0.10 | 0.12 | — | 0.08 | 0.40 |
| B | 2.2 | 4.0 | 0.05 | 0.95 | 0.48 | 0.11 | 0.11 | 0.12 | 0.10 | 0.41 |
| C | 2.8 | 4.2 | 0.29 | — | 0.44 | 0.10 | 0.18 | 0.17 | 0.21 | 0.38 |

The filler metals A and B are conventional, known filler metals; the filler metal C has the composition in accordance with the aforesaid parent application Ser. No. 914,531, abandoned.

After welding the samples were artificially aged in a conventional manner.

The results of the testing are given in Table II.

TABLE II

| Filler Metal | Strength of the Weld (N/mm$^2$) | Average Lifetime of the Jones test pieces (days) |
|---|---|---|
| A | 332 | 9 |
| B | 309 | 32 |
| C | 334 | 84 |

As Table II shows, the filler metal C exhibited a considerably improved resistance to corrosion.

EXAMPLE II

This example shows the results of testing welds in 4 mm thick sheet of an artificially aged AlZnMg 1 alloy, prepared using filler metal according to DIN 1732 and a filler metal according to the present invention and by means of various welding methods. The compositions of the filler metals are given in Table III.

TABLE III

| Filler Metal | Mg | Mn | Cu | Cr | Zn | Ti | Fe | Si |
|---|---|---|---|---|---|---|---|---|
| D | 4.9 | 0.35 | 0.05 | 0.12 | 0.12 | 0.17 | 0.38 | 0.30 |
| E | 4.8 | 0.35 | 0.31 | 0.15 | 0.15 | 0.14 | 0.25 | 0.20 |

Filler metal D corresponds to DIN 1732; filler metal E contains the copper content in accordance with the present invention.

The results of testing the welds for mechanical strength and corrosion resistance are given in Table IV.

TABLE IV

| Filler Metal | Welding Method | Weld Strength (N/mm$^2$) | Average Lifetime of Jones test pieces (days) |
|---|---|---|---|
| D | TIG,DC (Helium) | 336 | 24 |
| E | TIG,DC (Helium) | 337 | 90 |
| D | MIG-Pulsed-Arc | 305 | 21 |
| E | MIG-Pulsed-Arc | 305 | 52 |

The corrosion resistance of the welds prepared using the filler metal composition of the present invention was markedly superior to those prepared using the filler metal in accordance with DIN 1732. This was particularly so in the case of the TIG,DC-Helium weld.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A filler metal for welding aluminum alloys consisting essentially of: zinc from 0.05 to 0.25%; magnesium up to 5.5%; copper from 0.2 to 0.5%; manganese from 0.05 to 2.5%; titanium from 0.1 to 0.25%; chromium from 0.05 to 0.3%; and the balance aluminum, said metal being characterized by improved resistance to stress corrosion cracking and high weld strengths and suppression of weld boundary corrosion without a corresponding increase in susceptibility to exfoliation corrosion in the heat affected zone of the parent metal.

2. A filler metal for welding aluminum alloys of the AlZnMg type consisting essentially of: zinc from 0.05 to 0.25%; magnesium up to 5.5%; copper from 0.2 to 0.5%; manganese from 0.05 to 2.5%; titanium from 0.1 to 0.25%; chromium from 0.05 to 0.3%; less than 0.3% silicon; less than 0.4% iron; and the balance aluminum, said metal being characterized by improved resistance to stress corrosion cracking and high weld strengths and suppression of weld boundary corrosion without a corresponding increase in susceptibility to exfoliation corrosion in the heat affected zone of the parent metal.

3. A filler metal according to claim 2 containing from 0.05 to 5.5% magnesium and from 0.25 to 0.5% copper.

* * * * *